US009384753B2

(12) United States Patent
Sohn et al.

(10) Patent No.: US 9,384,753 B2
(45) Date of Patent: Jul. 5, 2016

(54) SOUND OUTPUTTING APPARATUS AND METHOD OF CONTROLLING THE SAME

(75) Inventors: Jun-il Sohn, Yongin-si (KR); Dong-wook Kim, Seoul (KR); Hong-sig Kim, Seongnam-si (KR); Jong-keun Song, Yongin-si (KR); Yoon-seo Koo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 529 days.

(21) Appl. No.: 13/221,269

(22) Filed: Aug. 30, 2011

(65) Prior Publication Data

US 2012/0051553 A1 Mar. 1, 2012

(30) Foreign Application Priority Data

Aug. 30, 2010 (KR) ........................ 10-2010-0084183

(51) Int. Cl.

*H04R 3/00* (2006.01)
*G10K 11/16* (2006.01)
*H04B 15/00* (2006.01)
*G10L 21/0208* (2013.01)
*H04R 29/00* (2006.01)
*G10L 21/0216* (2013.01)

(52) U.S. Cl.

CPC ... *G10L 21/0208* (2013.01); *G10L 2021/02166* (2013.01); *H04R 29/005* (2013.01)

(58) Field of Classification Search

CPC ............. H04S 1/00; H04S 7/00; H04S 7/303; H04R 29/00; H04R 29/005; H04R 2410/00; H04R 2430/20; H04R 2430/21; H04R 2430/23; H04R 2430/25; H04R 2201/401; H04R 2201/403; H04R 2201/405; G10L 21/0208; G10L 2021/02165; G10L 2021/02166

USPC ............ 381/71.1, 316, 317, 313, 320, 56, 58, 381/66, 71.11, 71.12, 92, 94.1, 94.2, 94.3, 381/94.7, 122, 124, 312; 700/94

See application file for complete search history.

(56) References Cited

U.S. PATENT DOCUMENTS 6,339,758 B1 * 1/2002 Kanazawa .............. G10L 21/02 381/94.3
8,238,593 B2 * 8/2012 Bisgaard ................ H04R 3/005 381/312

(Continued)

FOREIGN PATENT DOCUMENTS

JP 2004-023486 1/2004
JP 2008-135933 6/2006

(Continued)

OTHER PUBLICATIONS

Cherry, "Some Experiments on the Recognition of Speech, with One and with Two Ears," *The Journal of the Acoustical Society of America*, vol. 25, No. 5, Sep. 1953, pp. 975-979.

(Continued)

*Primary Examiner* — Vivian Chin
*Assistant Examiner* — William A Jerez Lora
(74) *Attorney, Agent, or Firm* — NSIP Law

(57) ABSTRACT

A sound outputting apparatus and a method of controlling the same are provided. A method of controlling a sound outputting apparatus includes extracting a noise signal and a desired signal, estimating a direction of arrival (DoA) of the extracted desired signal, and outputting sound.

27 Claims, 7 Drawing Sheets

(56) References Cited

U.S. PATENT DOCUMENTS

| | | | | |
|---|---|---|---|---|
| 2002/0173951 | A1* | 11/2002 | Ehara | G10L 19/07 704/219 |
| 2003/0137909 | A1 | 7/2003 | Ito et al. | |
| 2005/0216258 | A1* | 9/2005 | Kobayashi | G10L 21/0364 704/205 |
| 2007/0055505 | A1* | 3/2007 | Doclo | G10L 21/0208 704/226 |
| 2007/0269064 | A1* | 11/2007 | Allegro-Baumann | H04S 3/008 381/313 |
| 2008/0232607 | A1* | 9/2008 | Tashev et al. | 381/71.11 |
| 2010/0172506 | A1* | 7/2010 | Iwano | 381/23.1 |
| 2011/0231185 | A1* | 9/2011 | Kleffner | G10L 21/0272 704/226 |
| 2012/0027218 | A1* | 2/2012 | Every | G10L 21/0208 381/66 |

FOREIGN PATENT DOCUMENTS

| | | |
|---|---|---|
| JP | 2009-272876 | 11/2009 |
| KR | 10-2005-0110790 | 11/2005 |
| KR | 10-2009-0116055 | 11/2009 |
| KR | 10-2010-0010356 | 2/2010 |
| KR | 10-2010-0041741 | 4/2010 |

OTHER PUBLICATIONS

Hirsch, "The Influence of Interaural Phase of Interaural Summation and Inhibition," *The Journal of the Acoustical Society of America*, vol. 20, No. 4, Jul. 1948, pp. 536-544.

Yin, "Neural Mechanisms of Encoding Binaural Localization Cues in the Auditory Brainstem," *Integrative Functions in the Mammalian Auditory Pathway*, D. Oretel, R. Fay and A. Popper, Eds., New York, Springer-Verlag, pp. 99-159.

* cited by examiner

SOUND OUTPUTTING APPARATUS AND METHOD OF CONTROLLING THE SAME

CROSS-REFERENCE TO RELATED APPLICATIONS

This application claims the benefit of Korean Patent Application No. 10-2010-0084183, filed on Aug. 30, 2010, in the Korean Intellectual Property Office, the disclosure of which is incorporated herein in its entirety by reference for all purposes.

BACKGROUND

1. Field

The following description relates to sound outputting apparatuses and methods of controlling the same.

2. Description of the Related Art

Sound outputting apparatuses output sound from a sound source, and users are able to hear the output sound accordingly. In this regard, the sound outputting apparatuses may include hearing aids that receive, amplify, and output sound from surrounding sound and audio devices that output sound (such as MP3 players) as well. Human beings are able to perceive sound. Such an ability may be referred to as a perception ability or a perception capability. Furthermore, a degree of the perception capability is called perceptibility. Binaural hearing aids improve perceptibility of persons who have hearing difficulties by calculating power of each frequency band of a noise component included in an input signal and subtracting the calculated power of the noise component from a frequency spectrum of the input signal. In this regard, elements and characteristics such as valley detection, Minima statistics, histograms, Wiener filters, and the like may be used to calculate the power of the noise component. Nevertheless, if binaural hearing aids fail to accurately calculate the power of the noise component, a residual noise or a distortion of a sound signal may occur.

SUMMARY

Provided are sound outputting apparatuses for improving a user's perceptibility without distorting a speech signal and methods of controlling the same. Provided are computer-readable recording media having embodied thereon a program for executing the methods. The technical goals are not limited thereto, and other technical goals may also exist.

According to one general aspect, there is provided a method of controlling a sound outputting apparatus, the method including: receiving a sound; extracting, from the sound, a noise signal and a desired signal other than the noise signal; estimating a direction of arrival (DoA) of the extracted desired signal with respect to a user of the sound outputting apparatus; adjusting a DoA of the extracted noise signal based on the estimated DoA of the desired signal; and outputting an adjusted sound according to a result of the adjusting.

The adjusting of the DoA of the extracted noise signal may include adjusting the DoA of the extracted noise signal to have an angle that is substantially opposite to the DoA of the desired signal.

The adjusting of the DoA of the extracted noise signal may include adjusting the DoA of the extracted noise signal to have an angle that is substantially behind the user.

The DoA of the extracted noise signal may be a previously set azimuth angle with respect to a forward-facing direction of the user.

The adjusting of the DoA of the extracted noise signal may include applying at least one selected from the group of a time difference, a level difference, and any combination thereof, wherein the time difference and the level difference are determined with respect to left and right ears of the user to whom the noise signal is output.

The adjusting of the DoA of the extracted noise signal may include adjusting a gain corresponding to at least one selected from the group of the time difference, the level difference, and any combination thereof.

The adjusting of the DoA of the extracted noise signal may include determining a DoA of the noise signal that is to be adjusted; reading at least one selected from the group of a time difference, a level difference, and any combination thereof; and adjusting the time difference and the level difference between the left and right ears of the user to whom the noise signal is output as a read time difference and a read level difference, wherein the time difference and the level difference correspond to the determined DoA based on stored data, and wherein the stored data includes a DoA corresponding to the time difference between a first microphone and a second microphone of the sound outputting apparatus, and a DoA corresponding to the level difference between the first microphone and the second microphone of the sound outputting apparatus at which a signal is received.

The extracting of the noise signal and the desired signal may include determining a noise component of the sound, wherein the noise component has substantially static characteristics in a frequency domain; determining a desired component of the sound, wherein the desired component has substantially dynamic characteristics in the frequency domain; and extracting the noise signal corresponding to the noise component and the desired signal corresponding to the desired component.

The extracting of the noise signal and the desired signal may include applying a Fourier transformation operation to the sound.

The level difference may be determined as a difference in sound pressure level (SPL) with respect to the left ear of the user and SPL with respect to the right ear of the user.

According to another general aspect, there is provided a method of controlling a sound outputting apparatus, the method including: extracting a noise signal from a sound received by the sound outputting apparatus; adjusting a DoA of the extracted noise signal as a previously set azimuth angle with respect to a forward-facing direction of a user of the sound outputting apparatus; and outputting an adjusted sound according to a result of the adjusting.

The method may further include extracting a desired signal from the sound received by the sound outputting apparatus; and estimating a DoA of the extracted desired signal with respect to the user, wherein the adjusting of the DoA of the extracted noise signal includes adjusting the DoA of the extracted noise signal as the previously set azimuth angle based on the estimated DoA of the extracted desired signal.

According to another general aspect, there is provided a method of increasing a perceptibility of a sound by a user, the method including: receiving the sound; extracting, from the sound, a noise signal and a speech signal; estimating a DoA of the extracted speech signal with respect to the user; and adjusting a DoA of the extracted noise signal based on the estimated DoA of the speech signal.

The adjusting of the DoA of the extracted noise signal may include applying at least one selected from the group of a time difference, a level difference, and any combination thereof, wherein the time difference and the level difference are determined with respect to left and right ears of the user to whom the noise signal is output.

According to another general aspect, there is provided a non-transitory computer-readable recording medium having embodied thereon a program for executing the methods described herein.

According to another general aspect, there is provided a sound outputting apparatus including: a sound receiving unit for receiving a sound; a signal extracting unit for extracting, from the sound, a noise signal and a desired signal other than the noise signal; a DoA estimating unit for estimating a DoA of the extracted desired signal with respect to a user of the sound outputting apparatus; a DoA adjusting unit for adjusting a DoA of the extracted noise signal based on the estimated DoA of the desired signal; and a sound outputting unit for outputting an adjusted sound according to a result of the adjusting.

The DoA adjusting unit may adjust the DoA of the extracted noise signal to have an angle that is substantially opposite to the DoA of the desired signal.

The DoA of the extracted noise signal may have a previously set azimuth angle with respect to a forward-facing direction of the user.

The apparatus may further include a storage unit for storing data, wherein the stored data includes a DoA corresponding to a time difference between a first microphone and a second microphone of the sound receiving unit and a DoA corresponding to a level difference between the first microphone and the second microphone of the sound receiving unit.

The DoA adjusting unit may include a DoA determining unit for determining a DoA of the noise signal that is to be adjusted; a time difference and level difference reading unit for reading at least one selected from the group of the time difference, the level difference, and any combination thereof, wherein the time difference and the level difference correspond to the determined DoA based on the data stored in the storage unit; and a time difference and level difference adjusting unit for adjusting the time difference and the level difference between the left and right ears of the user to whom the noise signal is output as a read time difference and a read level difference.

The sound receiving unit may include a first microphone worn in or proximate to a left ear of the user; and a second microphone worn in or proximate to a right ear of the user.

The signal extracting unit may include a Fourier transform unit; an autocorrelation function calculating unit; and a cross-correlation function calculating unit.

Other features and aspects may be apparent from the following detailed description, the drawings, and the claims.

Figure 1:
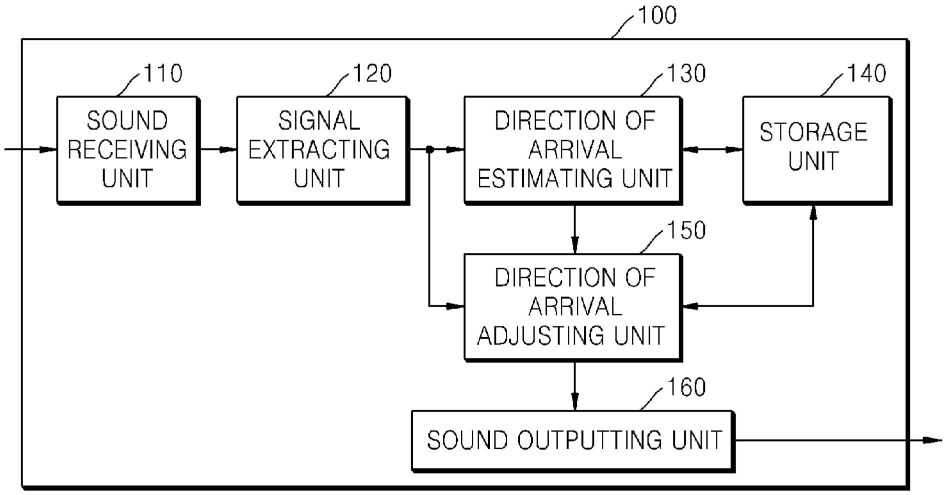
FIG. 1 is a block diagram illustrating a sound outputting apparatus according to an embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates a block diagram of a sound outputting apparatus 100. Referring to FIG. 1, the sound outputting apparatus 100 includes a sound receiving unit 110, a signal extracting unit 120, a direction of arrival (DoA) estimating unit 130, a storage unit 140, a DoA adjusting unit 150, and a sound outputting unit 160.

FIG. 1 illustrates only the elements of the sound outputting apparatus 100 according to one example. Accordingly, it should be understood that the sound outputting apparatus 100 may further include general-purpose elements other than the elements illustrated in FIG. 1.

Furthermore, the signal extracting unit 120, the DoA estimating unit 130, the DoA adjusting unit 150, and the sound outputting unit 160 of the sound outputting apparatus 100 may include one processor or a plurality of processors. Each processor may include an array of logic gates, or may include a combination of a general-purpose micro-processor(s) and a memory in which a program that may be executed in the general-purpose micro-processor(s) is stored. It should also be understood that the processor may include a different type of hardware.

The sound outputting apparatus 100 as described herein may refer to any apparatus for receiving a sound and outputting the sound, outputting an existing sound, or outputting a sound received from outside. As an example, the sound outputting apparatus 100 may be implemented as a binaural hearing aid that receives the sound from the peripheral and outputs the sound.

For descriptive convenience, although the sound outputting apparatus 100 is described as an example of a binaural hearing aid, it should be understood that the features described herein are not limited thereto.

The binaural hearing aid that is the sound outputting apparatus 100 is a device worn in both ears of a user to compensate for a hearing loss of the user. For example, the binaural hearing aid receives a sound wave from a sound source, converts the received sound wave into an electrical vibration, amplifies the converted electrical vibration by using an amplifier, reconverts the amplified electrical vibration into the sound wave, and outputs the reconverted sound wave. Thus, the sound outputting apparatus 100 may amplify a sound for a user who wears the sound outputting apparatus 100 and hears the sound.

The sound receiving unit 110 receives a sound. The sound receiving unit 110 may include a microphone for receiving the sound from the sound source. However, the described examples are not limited thereto, and the sound receiving unit 110 may include any device for perceiving and receiving the sound generated in the vicinity of the sound outputting apparatus 100.

It should be understood that the sound receiving unit 110 may include a plurality of microphones, or the sound outputting apparatus 100 may include a plurality of the sound receiving units 110. Accordingly, as an example, the sound receiving unit 110 may be worn in the right and left ears of the user who wears the sound outputting apparatus 100.

The signal extracting unit 120 extracts a noise signal and a desired signal from the sound received by the sound receiving units 110. The noise signal may include a background noise, a white noise, and the like. The desired signal generally refers to a signal other than the noise signal extracted from the sound received by the sound receiving units 110.

For example, the signal extracting unit 120 may separate the sound received by the sound receiving units 110 into a noise component having static characteristics in a frequency domain and a desired component having dynamic characteristics in the frequency domain. The signal extracting unit 120 may extract the noise signal as a signal that corresponds to the noise component, and the desired signal as a signal that corresponds to the desired component.

As a particular example, the signal extracting unit 120 converts the sound received by the sound receiving units 110 into the frequency domain. In this regard, the signal extracting unit 120 may use Fast Fourier Transformation (FFT).

The noise component typically has static characteristics in the frequency domain. Thus, the signal extracting unit 120 may separate the sound into a portion having static characteristics in the frequency domain and a portion having dynamic characteristics in the frequency domain, by converting the sound received by the sound receiving units 110 into the frequency domain.

The portion of the sound having static characteristics in the frequency domain typically corresponds to the noise component, and the portion of the sound having dynamic characteristics in the frequency domain typically corresponds to the desired component, according to a result of the separation. Examples of the desired component include a temporarily generated noise and a speech signal that the user of the sound outputting apparatus 100 desires to hear.

For example, the temporarily generated noise, for example a car warning sound, may include information useful to the user. Thus, the desired component may include all portions of the sound that do not have the static characteristics in the frequency domain.

Accordingly, the signal extracting unit 120 extracts the noise signal corresponding to the noise component having static characteristics and extracts the desired signal corresponding to the desired component having dynamic characteristics. The operation of the signal extracting unit 120 that extracts the noise signal and the desired signal is described herein with reference to FIG. 3.

However, the signal extracting unit 120 is not limited to applying a method of separating and extracting a noise signal and a desired signal according to the characteristics of a sound in the frequency domain. It should be understood that the signal extracting unit 120 may use various methods of separating and extracting the noise signal and the desired signal from the sound, for example, a statistic method (e.g., blind source separation (BSS)).

The DoA estimating unit 130 estimates a DoA of the desired signal with respect to the user of the sound outputting apparatus 100. That is, the DoA estimating unit 130 estimates the DoA of the desired signal extracted by the signal extracting unit 120 with respect to sounds that are relatively continuously input into the sound outputting apparatus 100 (e.g., sounds of the desired signal that are not temporary noises).

For example, if the receiving unit 110 includes a first microphone and a second microphone, the DoA estimating unit 130 estimates the DoA of the desired signal based on time and level differences in the desired component of the sound received by the sound receiving unit 110 between the first microphone and the second microphone.

The time difference may be described as a difference between the time when the desired component is received in the first microphone and the time when the desired component is received in the second microphone. The level difference may be described as a difference between a sound pressure level (SPL) of the first microphone that receives the desired component and a SPL of the second microphone that receives the desired component.

The first microphone and the second microphone of the sound receiving unit 110 are worn in or proximate to the left and right ears, respectively, of the user who wears the sound outputting apparatus 100. The DoA indicates a degree of a clockwise rotation of a position of a sound source, with respect to a forward-facing direction of the user (i.e., in front of the user) who wears the sound outputting apparatus 100. For example, the DoA may indicate an angle between the sound direction from the sound source to a noise of the user and the forward-facing direction of the user who wears the sound outputting apparatus 100.

The DoA estimating unit 130 determines the time and level differences in the desired signal between the first microphone and the second microphone of the sound receiving unit 110, and estimates the DoA of the desired signal based on the determined time and level differences.

In this regard, the time differences in the desired signal extracted by the signal extracting unit 120 between the first microphone and the second microphone of the sound receiving unit 110 may be an interaural time difference (ITD). However, the examples described herein are not limited thereto. The level difference in the desired signal extracted by the signal extracting unit 120 between the first microphone and the second microphone of the sound receiving unit 110 may be an interaural level difference (ILD). Again, the examples described herein are not limited thereto.

Further, a method of determining time and level differences in a predetermined signal between the first microphone and the second microphone of the sound receiving unit 110 should be understood by one of ordinary skill in the art, and thus a detailed description thereof will be omitted here.

The DoA estimating unit 130 may estimate the DoA of the desired signal based on data regarding the DoA with respect to a degree of the time difference and data regarding the DoA with respect to a degree of the level difference. These data may be stored in the storage unit 140. The estimation of the DoA of the desired signal in the DoA estimating unit 130 is described herein with reference to FIG. 4.

However, the DoA estimating unit 130 is not limited to estimating the DoA of the desired signal based on the time and level differences in the desired signal between the first microphone and the second microphone of the sound receiving unit 110. It should be understood by one of ordinary skill in the art that the DoA estimating unit 130 may use a phase difference (for example, an interaural phase difference (IPD)) in the desired signal between the first microphone and the second microphone of the sound receiving unit 110 as additional information.

The storage unit 140 stores the data regarding the DoA corresponding to the degree of the time difference in the desired signal between the first microphone and the second microphone of the sound receiving unit 110 and the data regarding the DoA corresponding to the degree of the level difference in the desired signal between the first microphone and the second microphone of the sound receiving unit 110.

It should be understood that the storage unit 140 may include one or more general storage media, such as a hard disk drive (HDD), a read only memory (ROM), a random access memory (RAM), a flash memory, a memory card, and the like.

The first microphone and the second microphone of the sound receiving unit 110 are worn in or proximate to the left and right ears, respectively, of the user. Thus, if the sound, which is generated in the vicinity of the sound outputting apparatus 100, is not, for example, directly in front of, above, or behind the user, the sound arrives in the first microphone and the second microphone of the sound receiving unit 110 at different times. Accordingly, a time difference in the sound between the first microphone and the second microphone occurs.

If the sound arrives in the first microphone and the second microphone of the sound receiving unit 110 at different times, a level difference in the sound between the first microphone and the second microphone may occur.

Therefore, the storage unit 140 may store data regarding a DoA of the sound according to a degree of the time difference and a DoA of the sound according to a degree of the level difference. The DoA estimating unit 130 may estimate the DoA of the desired signal based on the data previously stored in the storage unit 140.

The DoA adjusting unit 150 adjusts a DoA of the noise signal extracted by the signal extracting unit 120 based on the DoA of the desired signal estimated by the DoA estimating unit 130.

For example, the DoA adjusting unit 150 may adjust the DoA of the noise signal to be opposite to the DoA of the desired signal. In this regard, the DoA of the noise signal opposite to the DoA of the desired signal may mean that a difference between an azimuth angle of the desired signal and an azimuth angle of the noise signal, with respect to front of the user who wears the sound outputting apparatus 100, is 180°.

As another example, the DoA adjusting unit 150 may adjust the DoA of the noise signal to be behind the user who wears the sound outputting apparatus 100. In this regard, a point behind the user who wears the sound outputting apparatus 100 may indicate a previously set azimuth angle (for example, 180°) with respect to a forward-facing direction of the user who wears the sound outputting apparatus 100. That is, the DoA adjusting unit 150 may adjust the DoA of the noise signal to be 180° with respect to the forward-facing of the user who wears the sound outputting apparatus 100.

In this regard, when the DoA adjusting unit 150 adjusts the DoA of the noise signal to be behind the user, or to be a previously set azimuth angle with respect to the forward-facing direction of the user, the DoA adjusting unit 150 may not refer to the DoA of the desired signal estimated by the DoA estimating unit 130.

However, it should be understood that the DoA adjusting unit 150 may adjust the DoA of the noise signal based on the DoA of the desired signal estimated by the DoA estimating unit 130 such that the adjusted DoA is behind the user, only when the DoA of the desired signal is not behind the user. As another example, the DoA adjusting unit 150 may adjust the DoA of the noise signal to be a previously set azimuth angle with respect to the forward-facing direction of the user according to a user setting.

The DoA adjusting unit 150 may adjust the DoA of the noise signal to be a previously set azimuth angle behind the user when the DoA of the desired signal is in forward-facing direction of the user, and may adjust the DoA of the noise signal to be a previously set azimuth angle in forward-facing direction of the user when the DoA of the desired signal is behind the user.

Therefore, the noise component may be spatially separated from the desired component for the user who wears the sound outputting apparatus 100, thereby improving the perceptibility of the user.

The DoA adjusting unit 150 may adjust the DoA of the noise signal by using at least one of a time difference and a level difference at which the noise component of the sound received by the sound receiving unit 110 is output to the left and right ears of the user who wears the sound outputting apparatus 100.

The DoA adjusting unit 150 may adjust the DoA of the noise signal by determining the time difference and the level difference at which the noise component of the sound is output to the left and right ears of the user and by adjusting a gain corresponding to at least one of the determined time difference and level difference. The adjustment of the DoA of the noise signal in the DoA adjusting unit 150 is described herein with reference to FIGS. 2 through 6.

The sound outputting unit 160 outputs sound according to a result of the adjustment of the DoA adjusting unit 150. For example, the sound outputting unit 160 may include a speaker by which the user who wears the sound outputting apparatus 100 may hear the sound.

It should be understood that the sound outputting unit 160 may include a plurality of speakers, or that the sound outputting unit 100 may include a plurality of the sound outputting units 160. Thus, the sound outputting units 160 may be worn in or proximate to the left and right ears of the user who wears the sound outputting apparatus 100.

If the sound outputting apparatus 100 is configured as a binaural hearing aid, the sound outputting unit 160 may determine an amplification gain of each frequency with respect to information regarding the hearing loss of the user, determine a gain of an ITD and an ILD based on the adjustment of the DoA adjusting unit 150, combine the determined gains, apply the combined gains, and perform an inverse frequency transform operation on the sound according to a result of the application of the combined gains. Accordingly, the user may hear the amplified sound generated by the sound outputting apparatus 100. Such a signal processing operation performed by the sound outputting unit 160 should be understood by one of ordinary skill in the art, and thus a detailed description thereof will be omitted here.

Accordingly, the sound outputting apparatus 100 may control a directivity of the noise component included in the sound and improve the perceptibility and strength of the desired component that the user desires to hear.

The sound outputting apparatus 100 may not remove the noise component from the sound, thereby preventing the sound from being distorted. The sound outputting apparatus 100 may also extract the noise component having static characteristics, thereby preventing the sound, including information useful to the user, from being removed or omitted.

Figure 2:
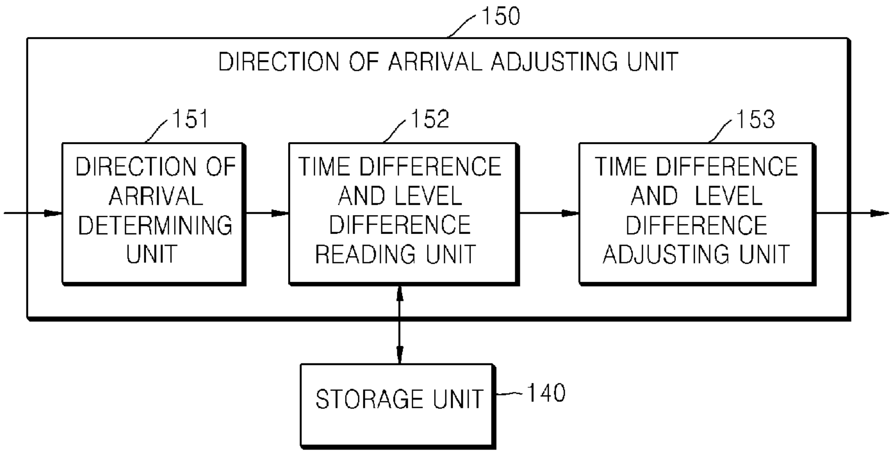
FIG. 2 is a block diagram illustrating a direction of arrival (DoA) adjusting unit.

FIG. 2 illustrates a block diagram of the DoA adjusting unit 150. Referring to FIG. 2, the DoA adjusting unit 150 includes a DoA determining unit 151, a time difference and level difference reading unit 152, and a time difference and level difference adjusting unit 153.

The DoA determining unit 151 determines a DoA of the noise signal that is to be adjusted. The DoA of the noise signal that is to be adjusted may be opposite to the DoA of the desired signal, may be behind the user who wears the sound outputting apparatus 100, or may be a previously set azimuth angle with respect to the forward-facing direction of the user.

The time difference and level difference reading unit 152 reads at least one of a time difference and a level difference corresponding to the DoA determined by the DoA determining unit 151 based on the data stored in the storage unit 140.

The time difference and level difference adjusting unit 153 adjusts the time difference and the level difference of the noise signal extracted by the signal extracting unit 120 that is output to the left and right ears of the user. The time difference and the level difference are read by the time difference and level difference reading unit 152.

For example, if the DoA determining unit 151 determines the DoA of the noise signal that is to be adjusted as a first azimuth angle, the time difference and level difference reading unit 152 reads at least one of the time difference and the level difference corresponding to the first azimuth angle based on the data stored in the storage unit 140. The time difference and level difference adjusting unit 153 adjusts at least one of the time difference and the level difference (i.e., a time difference and a level difference at which the noise signal extracted by the signal extracting unit 120 is output to left and right ears of the user) of the noise signal such that the at least one of the time difference and the level difference is read by the time difference and level difference reading unit 152. In this regard, the time difference and the level difference of the noise signal before being adjusted by the DoA adjusting unit 150 may be 0 (zero).

The time difference and level difference adjusting unit 153 may adjust a gain corresponding to the time difference and the level difference so as to have the time difference and the level difference correspond to the first azimuth angle. The adjustment of the gain may include a gain adjustment value used to adjust the DoA of the noise signal an additional factor.

That is, the time difference and level difference adjusting unit 153 may adjust only the time difference and the level difference of the noise signal, or may adjust a gain typically used to control the sound outputting apparatus 100 by applying the gain adjustment value used to adjust the DoA of the noise signal as the additional factor.

Accordingly, the sound outputting apparatus 100 may adjust the DoA of the noise component without additional hardware.

Figure 3:
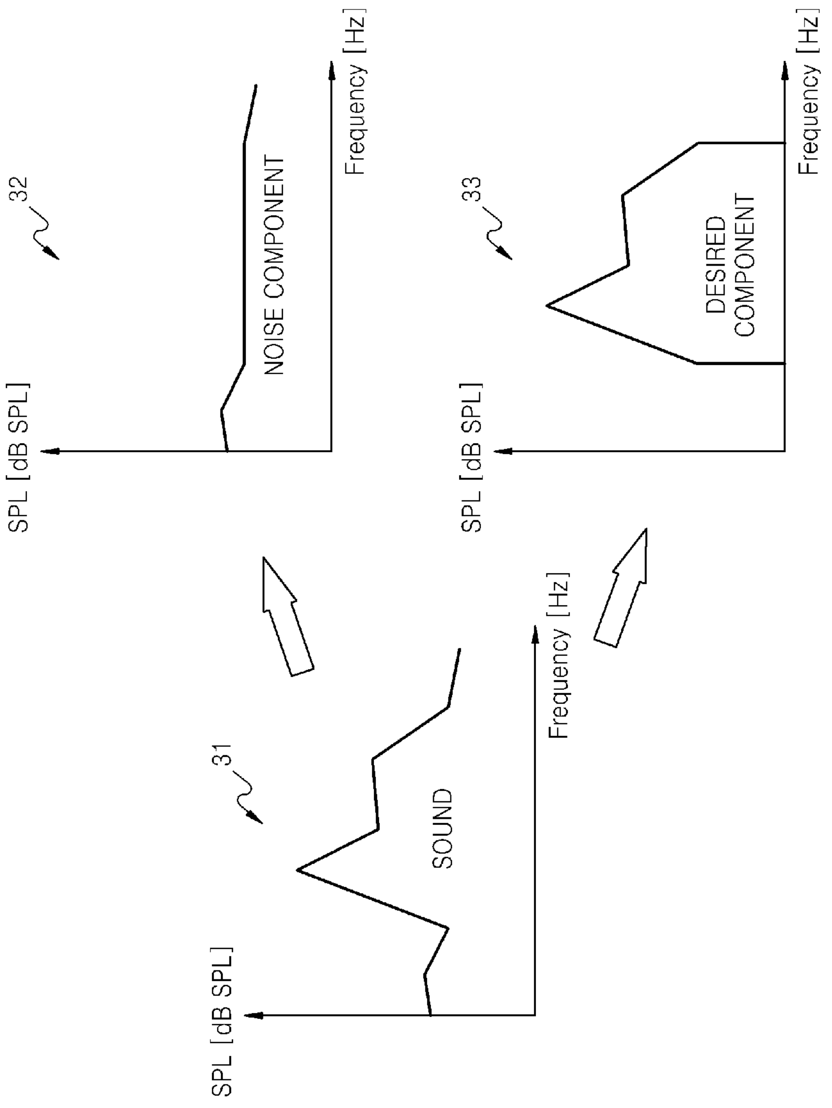
FIG. 3 illustrates three graphs as an example of a method of extracting a noise signal and a desired signal by using a signal extracting unit.

FIG. 3 illustrates three graphs 31, 32, and 33 as an example of a method of extracting a noise signal and a desired signal by using the signal extracting unit 120. Referring to FIG. 3, the graphs 31, 32, and 33 are related to a sound, a noise component, and a desired component, respectively.

The sound graph 31 shows a frequency domain of the sound received by the receiving unit 110. As described with reference to FIG. 1, the signal extracting unit 120 may convert the sound into the frequency domain by using FFT.

The sound graph 31 illustrates a mixture of sound that includes both a portion having static characteristics and a portion having dynamic characteristics. In this regard, the signal extracting unit 120 may separate the sound into the portion having static characteristics and the portion having dynamic characteristics.

The noise component graph 32 relates to the noise component of the sound received by the sound receiving unit 110, that is, the portion having static characteristics. The desired component graph 33 relates to the desired component of the sound received by the sound receiving unit 110, that is, the portion having dynamic characteristics.

Therefore, the signal extracting unit 120 may separate the sound into the noise component and the desired component, based on the frequency characteristics of the sound. A noise signal and a desired signal may be extracted according to a result of the separation.

Furthermore, since the signal extracting unit 120 determines the portion having static characteristics in the frequency domain as the noise component of the sound, the signal extracting unit 120 may extract the desired component including a temporary sound (for example, car horn sound, warning sound, and the like) that is likely to include information useful to the user as the desired signal. Thus, the sound outputting apparatus 100 may substantially prevent the sound, including the information useful to the user, from being classified as noise.

Figure 4:
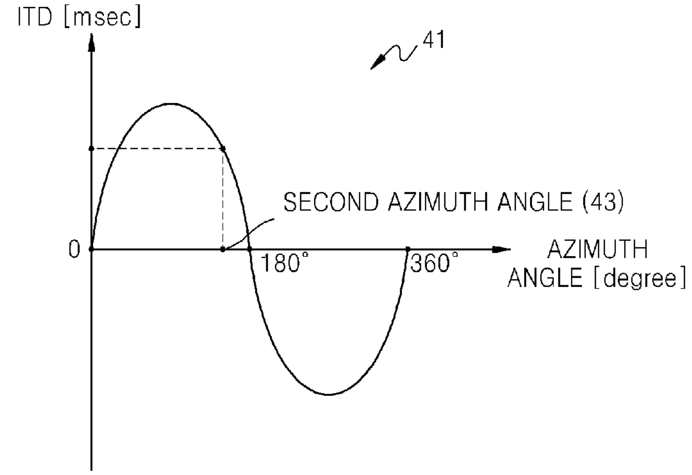
FIG. 4 illustrates two graphs as an example of a method of estimating a DoA of a desired signal by using a DoA estimating unit.
Figure 4:
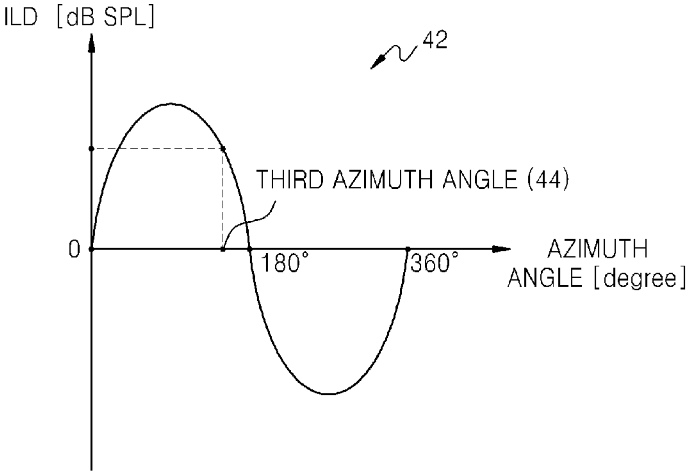

FIG. 4 illustrates two graphs 41 and 42 as an example of a method of estimating a DoA of a desired signal by using the DoA estimating unit 130. Referring to FIG. 4, the graph 41 shows a DoA with respect to a time difference between a first microphone and a second microphone of the sound receiving unit 110 at which a signal is received. The graph 42 shows a DoA with respect to a level difference between the first microphone and the second microphone of the sound receiving unit 110 at which the signal is received.

For descriptive convenience, in this example the time difference is an ITD, and the level difference is an ILD.

Data regarding graphs 41 and 42 are stored in the storage unit 140. The DoA estimating unit 130 may determine a second azimuth angle 43 corresponding to the ITD of the desired signal and a third azimuth angle 44 corresponding to the ILD of the desired signal, based on the data stored in the storage unit 140.

The DoA estimating unit 130 may estimate the DoA of the desired signal by appropriately combining the second azimuth angle 43 and the third azimuth angle 44. In this regard, it should be understood that the second azimuth angle 43 and the third azimuth angle 44 may be combined according to various methods, for example, a method of calculating an average of the second azimuth angle 43 and the third azimuth angle 44.

Therefore, the DoA estimating unit 130 may estimate the DoA of the desired signal based on the data stored in the storage unit 140.

Figure 5:
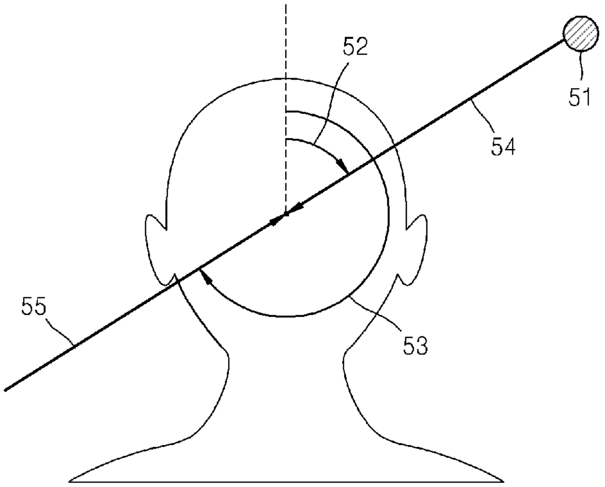
FIG. 5 is a diagram illustrating an example of a method of adjusting a DoA of a noise signal by using a DoA adjusting unit.

FIG. 5 is a diagram illustrating an example of a method of adjusting a DoA 55 of a noise signal by using the DoA adjusting unit 150. That is, FIG. 5 is a diagram for illustrating a method of adjusting the DoA 55 of the noise signal by applying the DoA adjusting unit 150 to be opposite to a DoA 54 of a desired signal.

The DoA of the desired signal may be a fourth azimuth angle 52, according to a point 51 at which a sound is generated, with respect to the forward-facing direction of a user. Thus, the DoA determining unit 151 determines a fifth azimuth angle 53, that is, the DoA 55 of the noise signal to be adjusted, as an angle formed by rotating the fourth azimuth angle 52 by 180° clockwise.

The time difference and level difference reading unit 152 may read at least one of a time difference and a level difference corresponding to the determined DoA, based on the data stored in the storage unit 140. Such a reading operation may be performed based on the graph 41 that illustrates the DoA with respect to the time difference between the first microphone and the second microphone of the sound receiving unit 110, and based on the graph 42 that illustrates the DoA with respect to the level difference between the first microphone and the second microphone of the sound receiving unit 110.

The time difference and level difference adjusting unit 153 adjusts the time difference and the level difference of the noise signal such that the time difference and the level difference is read by the time difference and level difference reading unit 152.

Therefore, the DoA adjusting unit 150 may adjust the DoA 55 of the noise signal to be opposite to the DoA 54 of the desired signal, thereby improving a user's perceptibility of the sound.

Figure 6:
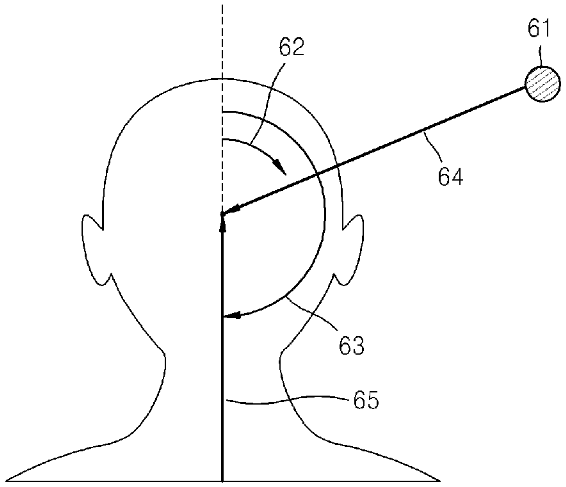
FIG. 6 is a diagram illustrating an example of a method of adjusting a DoA of a noise signal by using the DoA adjusting unit.

FIG. 6 is a diagram illustrating an example of a method of adjusting a DoA 65 of a noise signal by using the DoA adjusting unit 150. That is, FIG. 6 is a diagram for illustrating a method of adjusting the DoA 65 of the noise signal by applying the DoA adjusting unit 150 to be behind a user. In this regard, behind the user may be a previously set azimuth angle with respect to the forward-facing direction of the user. For descriptive convenience, in this example the previously set azimuth angle is 180°.

A DoA of a desired signal may be a sixth azimuth angle 62 according to a point 61 at which a sound is generated, with respect to forward-facing direction of the user. The DoA determining unit 151 determines a seventh azimuth angle 63, that is, the DoA 65 of the noise signal to be adjusted, as an angle formed by rotating 180° from the forward-facing direction of the user. In this regard, the seventh azimuth angle 63 is generally unrelated to the sixth azimuth angle 62.

A method of reading a time difference and a level difference in the determined DoA and adjusting a time difference and a level difference of the noise signal such that the time difference and level difference is read is similar to the method described with reference to FIG. 5; thus, a description thereof will not be repeated here.

Therefore, the DoA adjusting unit 150 may adjust the DoA 65 of the noise signal to be behind the user if a DoA 64 of a desired signal is not behind the user, based on the DoA 64 of the desired signal.

However, the DoA adjusting unit 150 is not limited thereto, and in another example the DoA adjusting unit 150 may adjust the DoA 65 of the noise signal to be behind the user all the time irrespective of the DoA 64 of the desired signal, thereby improving the user's perceptibility regarding the sound.

Figure 7:
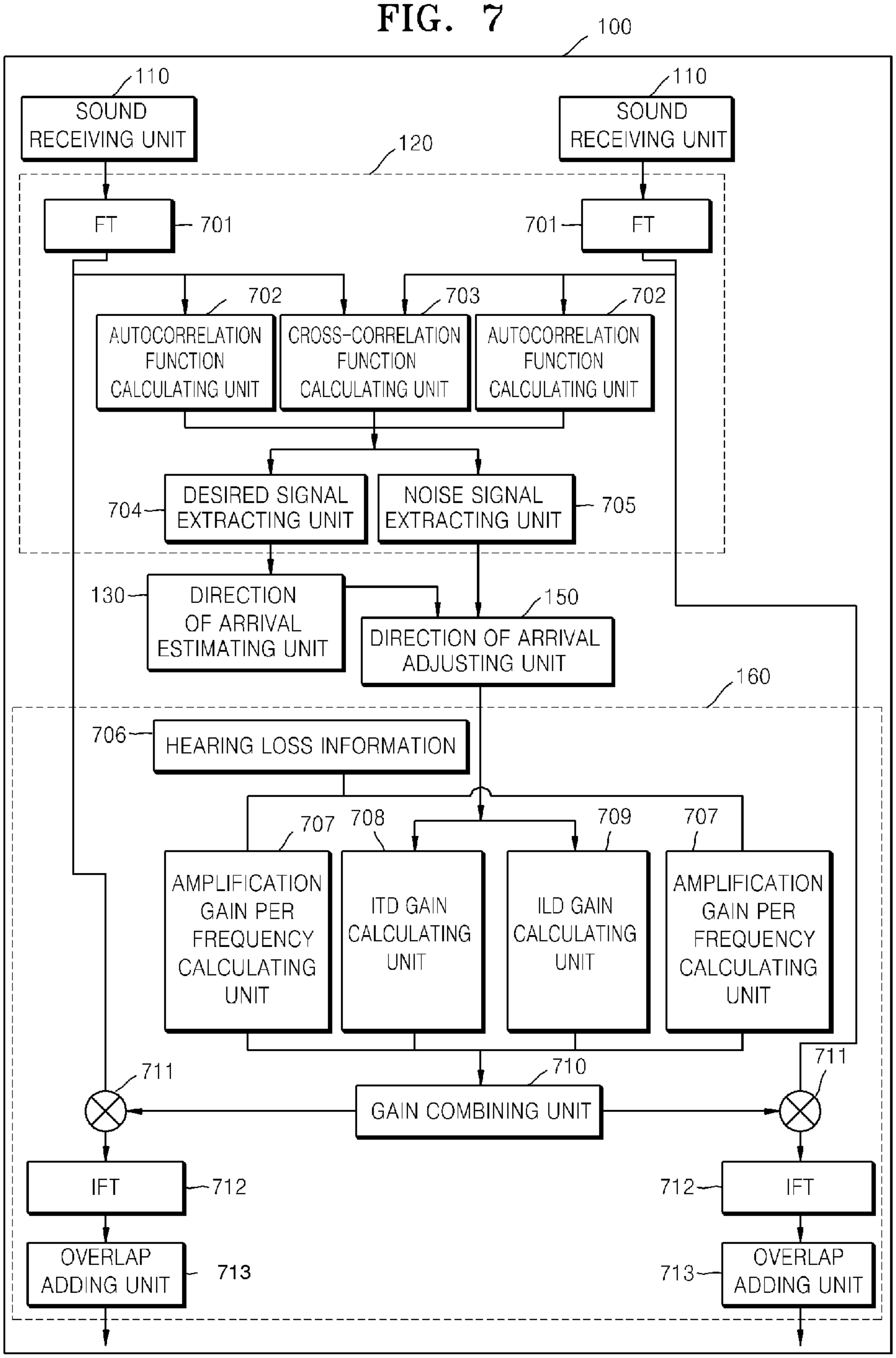
FIG. 7 is a block diagram illustrating another example of a sound outputting apparatus.

FIG. 7 illustrates a block diagram of another example of the sound outputting apparatus 100. In this example, the sound outputting apparatus 100 is presented as a binaural hearing aid, and thus the sound outputting apparatus 100 is not limited to the elements shown in FIG. 7.

The sound receiving units 110 are worn in or proximate to left and right ears of a user, and receive sound.

The signal extracting unit 120 extracts a desired signal and a noise signal from the sound received by the sound receiving units 110. That is, FT 701 applies a Fourier transformation operation to the sound, which is received by the sound receiving units 110. Accordingly, the sound it transformed into the frequency domain. In this regard, the Fourier transformation may be FFT.

Autocorrelation function calculating unit 702 calculates an autocorrelation function of the sound received by the sound receiving unit 110, with respect to the sound converted into the frequency domain. A cross-correlation function calculating unit 703 calculates a cross-correlation function of the sound received by the sound receiving unit 110, with respect to the sound converted into the frequency domain. Thus, the desired signal extracting unit 704 and the noise signal extracting unit 705 respectively extract a desired signal and a noise signal, based on the calculated autocorrelation function and cross-correlation function.

The DoA estimating unit 130 estimates a DoA of the extracted desired signal. The DoA adjusting unit 140 adjusts a DoA of the extracted noise signal.

The sound outputting unit 160 outputs sound according to an output of the DoA adjusting unit 140. Amplification gain per frequency calculating unit 707 calculates an amplification gain per frequency with respect to sound, which may be output to the left and right ears of the user based on hearing loss information 706 of the user.

An ITD gain calculating unit 708 and an ILD gain calculating unit 709 respectively calculate an ITD gain and an ILD gain based on an output of the DoA adjusting unit 150.

A gain combining unit 710 calculates a gain with respect to the amplification gain, the ITD gain, and the ILD gain calculated by the amplification gain per frequency calculating unit 707, the ITD gain calculating unit 708, and the ILD gain calculating unit 709, respectively.

Multiplication unit 711 multiplies the sound received by the sound receiving unit 110 and converted into the frequency domain by the gain calculated by the gain combining unit 710.

Inverse Fourier transformer (IFT) 712 performs an IFT operation on the sound that is to be output to the left and right ears of the user. In this regard, the IFT may be inverse fast Fourier transformation (IFFT).

Overlap adding units 713 apply an overlap adding operation to sound that is to be output to the left and right ears of the user. When the sound outputting apparatus 100 performs a signal processing operation on sound, the sound may be separated into sections that overlap each other, and thus the separated sections may overlap and be added.

Therefore, the sound outputting unit 160 may output the sound that the user is able to perceive.

The signal processing shown in FIG. 7 should be understood by one of ordinary skill in the art, and thus a detailed description thereof will not be given here.

Figure 8:
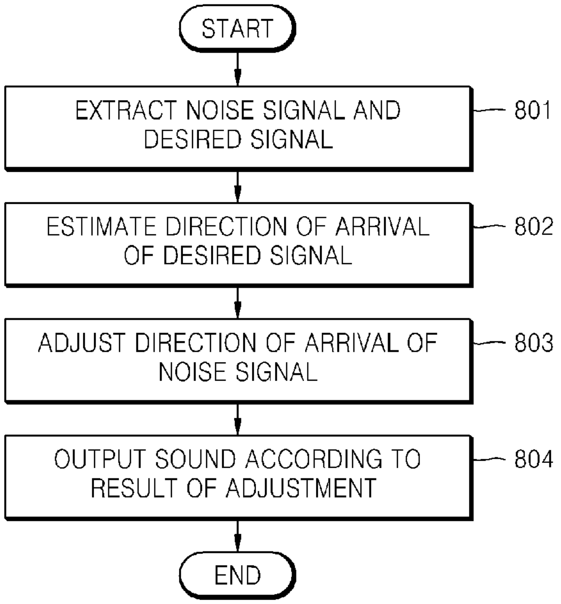
FIG. 8 is a flowchart illustrating an example of a method of controlling a sound outputting apparatus.
Figure 9:
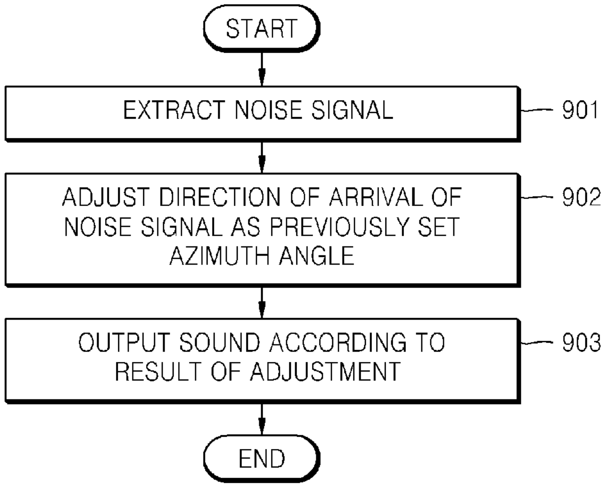
FIG. 9 is a flowchart illustrating another example of a method of controlling a sound outputting apparatus.
Figure 10:
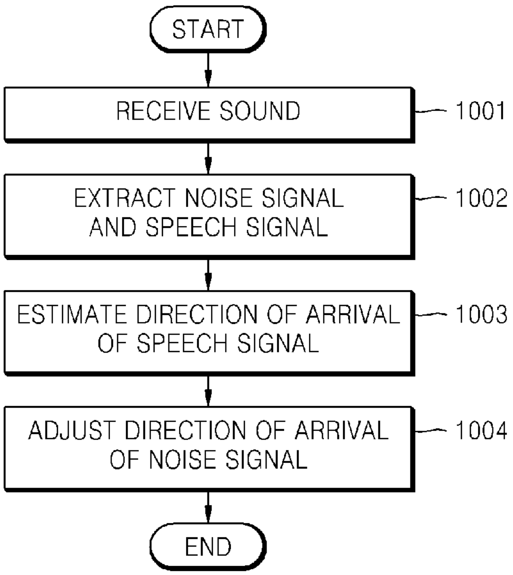
FIG. 10 is a flowchart illustrating a method of increasing perceptibility of a sound.

FIGS. 8 through 10 illustrate flowcharts of methods of controlling the sound outputting apparatus 100. The methods described with respect to FIGS. 8 through 10 include operations that may be performed by the sound outputting apparatus 100 of FIG. 1. Thus, although will not be described below, the description of the sound outputting apparatus 100 of FIG. 1 may be applied to the methods described with respect to FIGS. 8 through 10. As should be understood, the methods described with respect to FIGS. 8 through 10 may be applied to an apparatus other than sound outputting apparatus 100 of FIG. 1.

FIG. 8 illustrates a flowchart of an example of a method of controlling the sound outputting apparatus 100.

In operation 801, the signal extracting unit 120 extracts a noise signal and a desired signal other than the noise signal from a sound, which is received by the sound outputting apparatus 100. In this regard, the noise signal generally corresponds to a portion of the received sound having static characteristics in a frequency domain, and the desired signal generally corresponds to a portion of the received sound having dynamic characteristics in the frequency domain.

In operation 802, the DoA estimating unit 130 estimates a DoA of the desired signal extracted in operation 801 with respect to a user who wears the sound outputting apparatus 100. The DoA estimating unit 130 may estimate the DoA of the desired signal based on data stored in the storage unit 140.

In operation 803, the DoA adjusting unit 150 adjusts a DoA of the noise signal extracted in operation 801 based on the DoA of the desired signal estimated in operation 802. In this regard, the DoA of the noise signal may face (i.e., be opposite to) the DoA of the desired signal, may be behind the user, or may be a previously set azimuth angle.

In operation 804, the sound outputting unit 160 outputs sound according to a result of adjustment performed in operation 803.

FIG. 9 illustrates a flowchart of another example of illustrating a method of controlling the sound outputting apparatus 100.

Referring to FIG. 9, in operation 901, the signal extracting unit 120 extracts a noise signal from a sound received by the sound outputting apparatus 100. The noise signal generally corresponds to a portion of the received sound having static characteristics of a frequency domain.

In operation 902, the DoA adjusting unit 150 adjusts the DoA of the noise signal extracted in operation 901 as a previously set azimuth angle with respect to the forward-facing direction of a user who wears the sound outputting apparatus 100.

In operation 903, the sound outputting unit 160 outputs sound according to a result of adjustment performed in operation 902.

Therefore, as one example, the sound outputting apparatus 100 may spatially separate a noise component and a desired component that the user desires to hear and may thereby increase perceptibility and integrity with respect to the desired component. Furthermore, the sound outputting apparatus 100 may not remove the noise component of a sound, thereby substantially preventing the sound from being distorted.

FIG. 10 illustrates a flowchart of a method of increasing perceptibility of a sound.

Referring to FIG. 10, in operation 1001, the sound receiving unit 110 receives a sound.

In operation 1002, the signal extracting unit 120 extracts a noise signal and a speech signal from the sound received in operation 1001. In this regard, the noise signal generally corresponds to a portion of the received sound having static characteristics in a frequency domain, and the sound signal generally corresponds to a portion of the received sound having dynamic characteristics in the frequency domain.

In operation 1003, the DoA estimating unit 130 estimates a DoA of the speech signal extracted in operation 1002 with respect to the user.

In operation 1004, the DoA adjusting unit 150 adjusts a DoA of the noise signal extracted in operation 1002 based on the DoA of the speech signal estimated in operation 1003. In this regard, the DoA adjusting unit 150 adjusts the DoA of the noise signal by applying at least one of a time difference and a level difference between a first microphone and a second microphone of the sound receiving unit 110 at which the noise signal is received.

Therefore, the user's perceptibility of the speech signal may be improved by an acoustic device that includes the first microphone and the second microphone.

As described above, according to the one or more of the examples described above, a noise component of a sound, which is generated around the sound outputting apparatus 100, may not be removed, thereby increasing a perceptibility of a user without distorting the sound.

The units described herein may be implemented using hardware components and software components. For example, Fourier transform units, autocorrelation function calculating units, cross-correlation function calculating units, signal extracting units, DoA estimation units, DoA adjusting units, amplifiers, band-pass filters, analog to digital convertors, gain calculating units, multipliers, inverse Fourier transform units, adding units, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling a sound outputting apparatus, the method comprising:

receiving a sound;

extracting, from the sound, a noise signal and a desired signal in a frequency domain, wherein the noise signal is extracted based on static characteristics of the sound, and the desired signal is extracted based on dynamic characteristics of the sound;

estimating a direction of arrival (DoA) of the extracted desired signal, with respect to a user of the sound outputting apparatus;

adjusting a DoA of the extracted noise signal based on the estimated DoA of the extracted desired signal to spatially separate the noise signal and the desired signal; and outputting an adjusted sound according to a result of the adjusting, wherein the adjusting of the DoA of the extracted noise signal comprises adjusting the DoA of the extracted noise signal to be substantially opposite to the DoA of the desired signal.

2. The method of claim 1, wherein the adjusting of the DoA of the extracted noise signal comprises: adjusting the DoA of the extracted noise signal to comprise an angle that is substantially opposite to the DoA of the desired signal.

3. The method of claim 1, wherein the adjusting of the DoA of the extracted noise signal comprises: adjusting the DoA of the extracted noise signal to comprise an angle that is substantially behind the user.

4. The method of claim 1, wherein the DoA of the extracted noise signal is a previously set azimuth angle with respect to a forward-facing direction of the user.

5. The method of claim 1, wherein the adjusting of the DoA of the extracted noise signal comprises: applying at least one selected from the group of a time difference, a level difference, and any combination thereof, wherein the time difference and the level difference are determined with respect to left and right ears of the user to whom the noise signal is output.

6. The method of claim 5, wherein the adjusting of the DoA of the extracted noise signal comprises: adjusting a gain corresponding to at least one selected from the group of the time difference, the level difference, and any combination thereof.

7. The method of claim 1, wherein the adjusting of the DoA of the extracted noise signal comprises:

determining a DoA of the noise signal that is to be adjusted;

reading at least one selected from the group of a time difference, a level difference, and any combination thereof; and adjusting the time difference and the level difference between the left and right ears of the user to whom the noise signal is output as a read time difference and a read level difference, wherein the time difference and the level difference correspond to the determined DoA based on stored data, and wherein the stored data includes a DoA corresponding to the time difference between a first microphone and a second microphone of the sound outputting apparatus, and a DoA corresponding to the level difference between the first microphone and the second microphone of the sound outputting apparatus at which a signal is received.

8. The method of claim 1, wherein the extracting of the noise signal and the desired signal comprises:

determining a noise component of the sound, wherein the noise component has substantially static characteristics in the frequency domain;

determining a desired component of the sound, wherein the desired component has substantially dynamic characteristics in the frequency domain; and extracting the noise signal corresponding to the noise component and the desired signal corresponding to the desired component.

9. A method of controlling a sound outputting apparatus, the method comprising:

extracting a desired signal and a noise signal from a sound received by the sound outputting apparatus, in a frequency domain, wherein the noise signal is extracted based on static characteristics of the sound, and the desired signal is extracted based on dynamic characteristics of the sound;

estimating a DoA of the extracted desired signal with respect to a user of the sound outputting apparatus;

adjusting a DoA of the extracted noise signal as a previously set azimuth angle with respect to a forward-facing direction of the user based on the estimated DoA of the extracted desired signal to spatially separate the noise signal and the desired signal; and outputting an adjusted sound according to a result of the adjusting wherein the adjusting of the DoA of the extracted noise signal comprises adjusting the DoA of the extracted noise signal to be substantially opposite to the DoA of the desired signal.

10. A method of increasing a perceptibility of a sound by a user of a sound outputting apparatus, the method comprising:

receiving the sound;

extracting, from the sound, a noise signal and a speech signal, wherein the noise signal is extracted based on static characteristics of the sound, and the desired signal is extracted based on dynamic characteristics of the sound;

estimating a DoA of the extracted speech signal with respect to the user; and adjusting a DoA of the extracted noise signal based on the estimated DoA of the extracted speech signal to spatially separate the noise signal and the desired signal; and outputting an adjusted sound according to a result of the adjusting, wherein the adjusting of the DoA of the extracted noise signal comprises adjusting the DoA of the extracted noise signal to be substantially opposite to the DoA of the desired signal.

11. The method of claim 10, wherein the adjusting of the DoA of the extracted noise signal comprises: applying at least one selected from the group of a time difference, a level difference, and any combination thereof, wherein the time difference and the level difference are determined with respect to left and right ears of the user to whom the noise signal is output.

12. A non-transitory computer-readable recording medium having stored therein a program for executing the method of claim 1.

13. A non-transitory computer-readable recording medium having stored therein a program for executing the method of claim 9.

14. A non-transitory computer-readable recording medium having stored therein a program for executing the method of claim 10.

15. A sound outputting apparatus comprising:

a sound receiving unit configured to receive a sound;

a signal extracting unit configured to extract, from the sound, a noise signal and a desired signal, in a frequency domain, wherein the noise signal is extracted based on static characteristics of the sound, and the desired signal is extracted based on dynamic characteristics of the sound;

a DoA estimating unit configured to estimate a DoA of the extracted desired signal with respect to a user of the sound outputting apparatus;

a DoA adjusting unit configured to adjust a DoA of the extracted noise signal based on the estimated DoA of the extracted desired signal to spatially separate the noise signal and the desired signal; and a sound outputting unit configured to output an adjusted sound according to a result of the adjusting, wherein the adjusting of the DoA of the extracted noise signal comprises adjusting the DoA of the extracted noise signal to be substantially opposite to the DoA of the desired signal.

16. The apparatus of claim 15, wherein the DoA adjusting unit adjusts the DoA of the extracted noise signal to comprise an angle that is substantially opposite to the DoA of the desired signal.

17. The apparatus of claim 15, wherein the DoA of the extracted noise signal is a previously set azimuth angle with respect to a forward-facing direction of the user.

18. The apparatus of claim 15, further comprising:

a storage unit configured to store data, wherein the stored data comprises a DoA corresponding to a time difference between a first microphone and a second microphone of the sound receiving unit and a DoA corresponding to a level difference between the first microphone and the second microphone of the sound receiving unit.

19. The apparatus of claim 18, wherein the DoA adjusting unit comprises:

a DoA determining unit configured to determine a DoA of the noise signal that is to be adjusted;

a time difference and level difference reading unit configured to read at least one selected from the group of the time difference, the level difference, and any combination thereof, wherein the time difference and the level difference correspond to the determined DoA based on the data stored in the storage unit; and a time difference and level difference adjusting unit configured to adjust the time difference and the level difference between left and right ears of the user to whom the noise signal is output as a read time difference and a read level difference.

20. The method of claim 1, wherein the extracting of the noise signal and the desired signal comprises applying a Fourier transformation operation to the sound.

21. The apparatus of claim 15, wherein the sound receiving unit comprises:

a first microphone worn in or proximate to a left ear of the user; and a second microphone worn in or proximate to a right ear of the user.

22. The apparatus of claim 15, wherein the signal extracting unit comprises:

a Fourier transform unit;

an autocorrelation function calculating unit; and a cross-correlation function calculating unit.

23. The method of claim 5, wherein the level difference is determined as a difference in sound pressure level (SPL) with respect to the left ear of the user and SPL with respect to the right ear of the user.

24. The method of claim 1, wherein the DoA of the extracted noise signal is adjusted with respect to the user of the sound outputting apparatus.

25. The method of claim 9, wherein the previously set azimuth angle is a precalibrated azimuth angle with respect to the forward-facing direction of the user.

26. A method of controlling a sound outputting apparatus, the method comprising:

receiving a sound;

extracting, from the sound, a noise signal and a desired signal, based on a statistical method in a frequency domain;

estimating a direction of arrival (DoA) of the extracted desired signal, with respect to a user of the sound outputting apparatus;

adjusting a DoA of the extracted noise signal based on the estimated DoA of the extracted desired signal to spatially separate the noise signal and the desired signal; and outputting an adjusted sound according to a result of the adjusting, wherein the adjusting of the DoA of the extracted noise signal comprise adjusting the DoA of the extracted noise signal to be substantial opposite to the DoA of the desired signal.

27. The method of claim 26, wherein the statistical method is blind source separation (BSS).

* * * * *